United States Patent Office 3,547,817
Patented Dec. 15, 1970

3,547,817
INHIBITION OF SCALE FORMATION
Gerald D. Hansen, Jr., Holicong, and Elizabeth A. Guthrie, Philadelphia, Pa., assignors to Betz Laboratories, Inc., Trevose, Pa., a corporation of Pennsylvania
No Drawing. Filed June 22, 1967, Ser. No. 647,931
Int. Cl. C02b 5/00
U.S. Cl. 210—58      12 Claims

ABSTRACT OF THE DISCLOSURE

The disclosure concerns methods and materials for the elimination or reduction of scale formed from impurities contained by water and petroleum or crude oil by means of treating the entrained impurities with the combination of an adsorbent and iron, zinc, nickel, cobalt, cadmium, copper or aluminum ions. The latter ions are employed to broaden the adsorption potential of the adsorbent and thereby render it effective in respect to a greater number of contaminants possessed of different and widely varying electrostatic conditions.

---

The utilization of water which contains certain inorganic impurities, and the production and processing of crude oil containing such impurities, is plagued by the precipitation of these impurities with subsequent scale formation. In the case of water which contains these contaminants the harmful effectsof scale formation are generally confined to the reduction of the capacity or bore of receptacles and conduits employed to store and convey the contaminated water. In the case of conduits, the impedance of flow is an obvious consequence. However, a number of equally consequential problems are realized in specific utilizations of contaminated water. For example, scale formed upon the surfaces of storage vessels and conveying lines for process water may break loose and these large masses of deposit are entrained in and conveyed by the process water to damage and clog equipment through which the water is passed, e.g., tubes, valves, filters, and screens. In addition, these crystalline deposits may appear in, and detract from, the final product which is derived from the process, e.g., paper formed from an aqueous suspension of pulp. Furthermore, when the contaminated water is involved in a heat exchange process, as either the "hot" or "cold" medium, scale will be formed upon the heat exchange surfaces which are contacted by the water. Such scale formation forms in insulating or thermal opacifying barrier which impairs heat transfer efficiency as well as impeding flow through the system.

The problem of scale formation is both compounded and multi-faceted in the production and processing of petroleum, as the combined or individual result of high levels of contaminants and conditions which favor the precipitation and growth of these contaminants as scale. These high levels of contaminants may be supplied by process fluids employed in the production of the petroleum, e.g., drilling muds, water floods employed to pressurize the producing formations, etc., from the mineral deposits leached or eroded from producing and adjacent formations, e.g., limestone, and from the salt solutions or brines which are admixed with the crude oil. Regardless of the source, these contaminants are prone to precipitation and scale formation, and this tendency is accelerated by the changed physical conditions which attend the withdrawal of the petroleum from the producing formations. Specifically, the extensive reduction of pressure which results from such withdrawal permits the release of carbon dioxide with the consequent supersaturation of the brines or salt solutions contained by the petroleum.

In addition to increased scale potential, petroleum production and processing are also characterized by a number of phases in which scale formation is particularly troublesome. For example, the precipitation of contaminants is commonly experienced upon the withdrawal of the petroleum from the producing formation and is undoubtedly accelerated by the previously described reduction in pressure and supersaturation. As a consequence, plugging of the producing formation, well-strainers, valves, tubing, etc., is frequently experienced. In addition, scale is formed upon surface storage and processing equipment such as pipes, valves, heating coils and tubes, separators, scrubbers, heater-treaters, etc. In many of these processes scale reduces heat transfer and operating efficiency as well as impeding flow and inducing mechanical failure, e.g., the binding or clogging of pumps and valves.

While calcium sulfate and calcium carbonate are primary contributors to scale formation, other salts of alkaline-earth metals and the aluminum silicates are also offenders, e.g., magnesium carbonate, barium sulfate, the aluminum silicates provided by silts of the bentonitic, illitic, kaolinitic, etc., types.

Efforts to prevent the formation of scale from the above contaminants have been largely unsuccessful and scale control is primarily dependent upon the laborious expensive removal of scale which has already formed. Due to the divergent chemical and solubility characteristics of the constituents of scale, a combined treatment involving mechanical removal, and both acidic and alkaline soaks is normally required. For example, potassium hydroxide is capable of converting calcium sulfate constituents to calcium hydroxide which is relatively easy to remove. However, the carbonates resist such alkaline reagents and normally require acidic treatments.

It is an object of the present invention to provide methods and compositions which prevent or reduce the formation of scale deposits from water or crude petroleum containing alkaline earth metal salts or aluminum silicates. These and other objects will become apparent upon an examination of the present specification and claims.

The foregoing objects are achieved by treating water or crude petroleum which contains alkaline earth metal salts or aluminum silicates with an adsorbent and a metal ion. It is believed that the improvement yielded by the invention is the result of the extension of the adsorption range of the adsorbent. Specifically, while an adsorbent may serve to reduce scale formation, its effectiveness is limited by the fact that its adsorption potential is maximum at certain electrostatic conditions. Accordingly, only those contaminants having adsorption characteristics which match or approximate those of the adsorbent are effectively dealt with. However, it is believed that the prescribed metal ions exchange with cations in the surface of the contaminants and thereby render the contaminants susceptible to the adsorption range of the adsorbent. The fact that the applicants have established that such ion exchange does occur, and the fact that adsorbents are rendered much more highly effective in the control of scale when combined with these metal ions, lends substantial credence to the suggested theory.

The adsorbents which may be enhanced by means of the inventive methods are those water soluble and dispersible adsorbents which are normally employed in the adsorption of inorganic contaminants. While certain phosphonic acids and their salts are preferred in the practice of the invention, other more conventional adsorbents are similarly enhanced. Typical of these conventional adsorbents are lignins, lignosulfonates and partially desulfonated lignosulfonates, tannins, starches, seaweed derivatives such as sodium mannuronate, sodium alginate or agar-agar, and those polymeric adsorbents or polyelectrolytes which may be represented by the polymers, or water soluble salts thereof, which contain the group

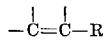

in which R is nitrile, amide, carboxyl or carboxyl alkyl. Typical of such polymers are the polyacrylamides, polyacrylates and sodium polyacrylates and various copolymers thereof. Polymers of the described type which have a molecular weight of between 5,000 to 15,000,000 are generally suitable. Such polymers are disclosed by U.S. Pat. 3,085,916.

The phosphonic acid derivatives preferred as adsorbents in the practice of the invention are the amino tri (lower alkylidene phosphonic acids), or the water soluble salts thereof. Such acids may be represented by the formula:

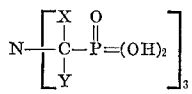

in which X and Y are hydrogen or an alkyl group having between 1 to 4 carbon atoms. Typical of such acids are amino tri (methylenephosphonic) acid, amino tri(ethylidenephosphonic) acid and amino tri(isopropylidenephosphonic) acid. Equally suitable are the ammonium, amine and metal salts of these acids, such as the ammonium, amine and pentasodium salts of amino tri(methylphosphonic) acid, i.e.,

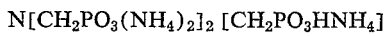

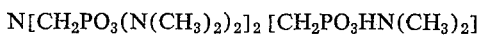

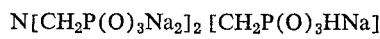

Such acids and salts, and methods for the preparation thereof, are amply disclosed by U.S. Pat. 3,234,124.

The metal ions employed in the practice of the invention are supplied in the form of the water soluble compounds of iron, zinc, nickel, cobalt, cadmium, copper and aluminum. While zinc chloride is preferred upon the basis of combined efficacy and economy, other water soluble salts such as zinc bromide, zinc iodide, zinc nitrate, ferrous nitrate, ferrous chloride, ferric chloride, nickel nitrate, nickel perchlorate, cobalt chloride, cobaltous chloride, cadmium chloride, cadmium chlorate, cupric chloride, cupric nitrate, aluminum chloride, etc., are also suitable.

The quantity of adsorbent and metal ion donor, and the ratio of these two materials, is largely dependent upon the extent and nature of the contaminants which are present in the water or crude petroleum to be treated. For example, if the system to be treated contains large quantities of contaminants which fall outside of the maximum adsorption range of the adsorbent to be employed, the quantity of the metal ion donor must be increased. In determining the particular regime of treatment to be employed, an analysis of the contaminants present in the system may avoid an extensive trial and error approach. If the analysis reveals a high contaminant level it is apparent that appreciable quantities of the treating materials will be required. If it also shows that a significant portion of the contaminants are materials not readily adsorbed by the selected adsorbent, a high ratio of the metal ion donor is indicated. For example, analysis reveals a high contaminant level which predominantly comprises calcium sulfate. Amino tri(methylenephosphonic acid) is selected as the adsorbent on the basis of its adsorption affinity with calcium sulfate and zinc chloride is selected as the metal ion donor on the basis of its water solubility and economy. Samples of the system to be treated are then admixed with a quantity of the adsorbent which is calculated to be adequate in respect with a quantity of the adsorbent which is calculated to be adequate in respect to the total quantity of contaminant, i.e., 0.01 to 10.0 parts by weight of adsorbent for each part by weight of contaminant. In this regard, it should be noted that the adsorbent: contaminant relationship is physical rather than chemical and the quantity of adsorbent is not stoichiometric but is instead based upon the adsorption potential of the adsorbent in relation to inorganic contaminants generally. The fixed quantity of adsorbent is combined with gradually increasing quantities of the metal ion donor which are added to the samples of the system to be treated. Precipitation studies (quantity/time at fixed similar conditions) may then be conducted to ascertain the adsorbent metal ion donor ratio which yields optional results at acceptable costs.

It must be stressed that the total quantity of adsorbent and metal ion donor, and the ratio of these two materials, is dependent upon the quantity and nature of the contaminants which are present in the system to be treated. It has been found in most cases that from 0.01 to 4 parts by weight of the metal ion donor per part by weight of the adsorbent have been particularly effective.

In the treatment of systems which involve appreciable flow, i.e., water floods, the adsorbent and metal ion donor may be merely added to the system and will be dispersed as a result of the flow within the system. In static systems, e.g., storage or holding tanks for water, crude petroleum or partially processed crude petroleum, some agitation may be required to insure the uniform and thorough dispersion of the treating materials. However, it should be noted that the water solubility of both the adsorbent and the metal ion donor render them dispersible with little or no effort in aqueous systems or systems containing an aqueous phase. In the case of the treatment of petroleum, it should be noted that the contaminants dealt with are predominantly entrained by aqueous phases within the system, e.g., contained brines, water admixed with the petroleum as the result of water floods, subterranean seepage, etc.

A preferred composition of the invention comprises the combination of zinc chloride and amino tri(methylenephosphonic acid). This combination has proved effective against a broad spectrum of contaminants under widely varying application conditions. A suitable form of the preferred combination may be prepared by the method set forth in Example 1, below.

EXAMPLE 1

Twenty parts by weight of anhydrous zinc chloride were dissolved with agitation in 100 parts of water. To this mixture, 50 parts by weight of amino tri(methylenephosphonic acid) were added with further agitation.

Representative of other suitable systems are the materials whose preparation is described by Examples 2–4, below.

EXAMPLE 2

The preparation of Example 1 was repeated with the substitution of 25 parts by weight of ferrous nitrate for the zinc chloride, and 50 parts by weight of penta sodium amino tri(methylenephosphonate) for the amino tri (methylenephosphonic acid).

EXAMPLE 3

The preparation of Example 1 was treated with the substitution of 25 parts by weight of cupric chloride for the zinc chloride and 75 parts by weight of partially desulfonated lignosulfonate for the phosphonic acid.

EXAMPLE 4

The preparation of Example 1 was repeated with the substitution of 60 parts by weight of polyacrylamide having a molecular weight of 90,000 for the phosphonic acid.

The efficiency of the inventive methods and materials in the achievement of the inventive goals is readily demonstrated by the field trials conducted under varying conditions which are set forth in Examples 5–8 below.

EXAMPLE 5

In the operation of a petroleum production water flood in the Rio Grande Valley at the rate of 40,000 barrels of water per day, excessive calcium carbonate scale formation was experienced to the detriment of the operation of submerged well pumps, meters, injection pumps and injection wells. The water contained 16,500 parts per million of dissolved solids and the bottom hole temperature was 230° F. Prior to treatment scale became evident within 14 days after cleaning. The flooding water was treated with the material of Example 1 in a volumetric ratio of 1:300,000. After 60 days of continuous treatment, no evidence of scale formation was observed.

EXAMPLE 6

In the initiation of a water flood in East Texas, water containing 107,000 p.p.m. of dissolved solids was employed in an application involving a bottom hole temperature of 160° F. After 10 days of operation, the shutdown of the injection pump was required due to scale formation. An organic phosphate adsorbent was then added to the flooding water but operations in excess of 10 days could not be achieved. Analysis of the scale deposits during such treatment revealed the presence of both calcium carbonate and reverted polyphosphate. The material of Example 1 was fed to the flooding water at a volumetric ratio of 1:220,000. After 50 days of operation, the system has not experienced a shutdown and inspection continues to show a complete absence of scale.

EXAMPLE 7

A heater-treater was experiencing scale buildup on the fire tubes and a downstream filter employed to clean the derived water prior to subsurface disposal. The use of an organic adsorbent yielded some benefit but scale deposits were still in evidence on the fire tube and some filter plugging was experienced. Treatment with the material of Example 1 was initiated and after 120 days of treatment no indications of tube deposits or filter plugging have been found. In addition, heat transfer rates have constantly improved to positively indicate a gradual clean-up of deposits from the fire tube. Analysis has also shown that the treating material is not being lost through separation with the oil.

EXAMPLE 8

The material of Example 1 was employed in the treatment of a heater-treater which exhibited approximately ¾ inch of calcium sulfate scale on the surface of the fire tube. After short term treatment (1:11,000 volumetric), the scale was reduced to a maximum thickness of ¼″ with many areas of the tube surface being completely free from scale.

The aforementioned ability of the metal ions to exchange with the surface of the contaminants has been demonstrated on an experimental basis. This ability on the part of zinc is demonstrated by Example 9 below.

Example 9

Synthetically "contaminated" systems were prepared by dispersing 10 cc. of saturated $Na_2CO_3$ and 1 cc. of saturated $CaCl_2$ 200 cc. of deionized water to yield 0.67 gram of $CaCO_3$ dispersed throughout each system. Such systems were then treated with penta sodium amino tri(methylenephosphonate) at concentrations of 1, 2, 5 and 10%, based on $CaCO_3$, i.e. 0.0067, 0.0134, 0.0335 and 0.067 gram respectively. A second set of systems was also prepared in which the phosphonate was employed in identical quantities but was combined with zinc in the form of zinc chloride in a 2:1 weight ratio (phosphonate:zinc). The systems which contained only the phosphonate were marked by some turbidity but no perceptible floc formation. The systems which contained both the phosphonate and the zinc yielded clear supernatant systems containing measurable quantities of floc. For example, the system which contained 0.0335 gram of phosphonate and 0.0167 gram of zinc yielded 85 cc. of floc while the system treated with 0.067 gram of phosphonate and 0.0335 gram of zinc yielded 104 cc. of floc. It is believed that this study clearly indicates the effect of the metal ion in rendering the contaminant susceptible to the adsorption potential of the adsorbent by an ion exchange reaction between the metal ion and the contaminant. Specifically, the study indicated that the phosphonate was incapable of adsorbing with the contaminant to achieve floc formation. However, when metal ions in the form of zinc were superimposed upon the system, they combined with the contaminant in an ion exchange to change the adsorption potential of the contaminant and thereby render it susceptible to adsorption with the phosphonate.

We claim:

1. A method for reducing the precipitaion of alkaline earth metal salts and aluminum silicate impurities from liquids containing these impurities and reducing the scale from the impurities, comprising adding to said liquid:
   (1) an adsorbent selected from the group consisting of:
      (i) an amino-tri(lower alkylidene phosphonic acid) having the formula

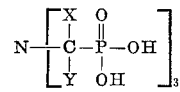

wherein X and Y are hydrogen or alkyl of from 1 to 4 carbon atoms, and
      (ii) the water soluble salts of said phosphonic acid, and
   (2) a water-soluble salt of a metal selected from iron, nickel, cobalt, zinc, cadmium, copper and aluminum.

2. The method as claimed by claim 1 in which said adsorbent is amino tri(methylenephosphonic acid).

3. A method as claimed by claim 1 in which said adsorbent is the ammonium salt of amino tri(methylenephosphonic acid).

4. A method as claimed by claim 1 in which said adsorbent is the amine salt of amino tri(methylenephosphonic acid).

5. A method as claimed by claim 1 in which said adsorbent is the pentasodium salt of amino tri(methylenephosphonic acid).

6. A method as claimed by claim 1 in which said adsorbent is employed in a quantity of between 0.01 to 10.0 parts by weight for each part by weight of said impurities.

7. A method as claimed by claim 1 in which said salt is employed in a quantity of between 0.1 to 4 parts by weight for each part by weight of said adsorbent.

8. A method as claimed by claim 1 in which said salt is zinc chloride.

9. A method as claimed by claim 1 in which said liquid is water.

10. A method as claimed by claim 1 in which said liquid is petroleum.

11. A method as claimed by claim 1 in which said adsorbent and said salt are dispersed in water prior to said adding to said liquid.

12. A method according to claim 11 wherein the adsorbent and said salt are mixed in a weight ratio such that when the mixture of said adsorbent and said salt is added to the liquid to be treated the adsorbent is present in an amount which is equal to 0.1 to 10.0 parts by weight for each part by weight of said impurities and said water soluble metal salt is present in an amount of from 0.01 to about 4 parts by weight for each part by weight of said adsorbent.

References Cited

UNITED STATES PATENTS

| | | | |
|---|---|---|---|
| 2,777,818 | 1/1957 | Gambill | 252—180X |
| 2,980,610 | 4/1961 | Ruehrwein | 210—58 |
| 3,256,203 | 6/1966 | Robertson et al. | 252—178 |
| 3,234,124 | 2/1966 | Irani | 210—58 |
| 3,336,221 | 8/1967 | Ralston | 210—58 |
| 3,352,793 | 11/1967 | Robertson | 252—180X |

MICHAEL ROGERS, Primary Examiner

U.S. Cl. X.R.

252—8.55, 87, 181